Patented Oct. 29, 1935

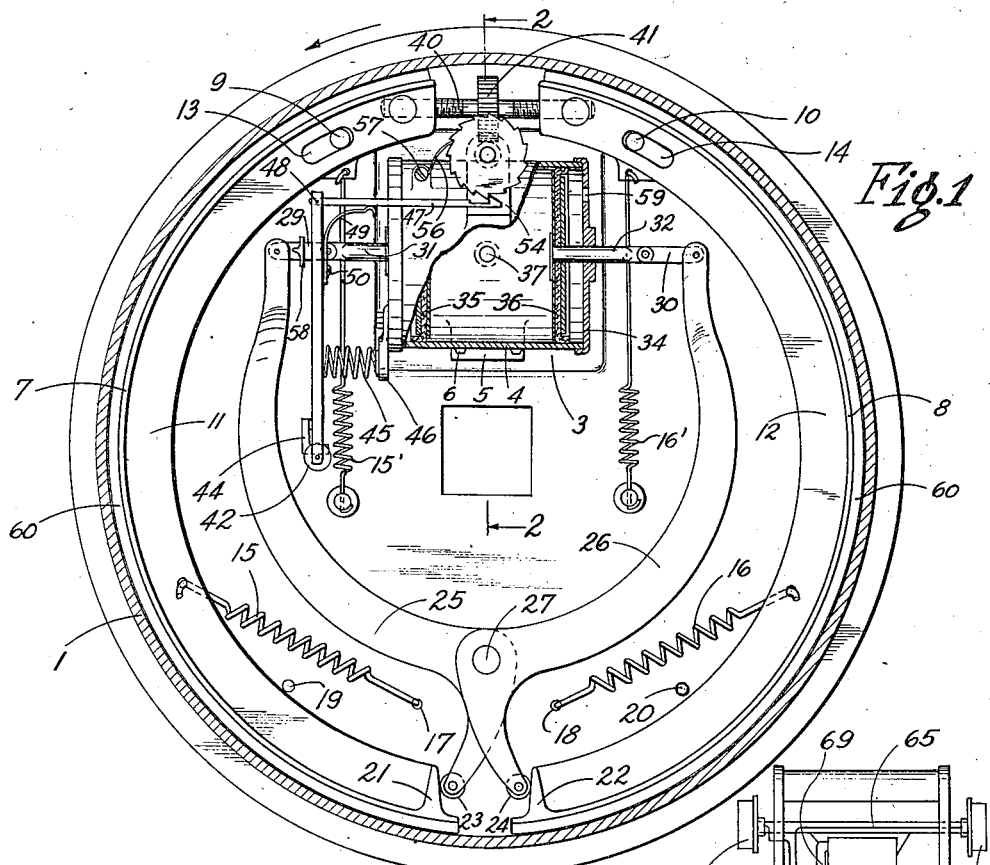

2,018,845

UNITED STATES PATENT OFFICE 2,018,845

BRAKE MECHANISM

Frederick G. Folberth and William M. Folberth, Cleveland, Ohio

Application May 27, 1933, Serial No. 673,233

1 Claim. (Cl. 188—152)

This invention relates to brakes and more particularly to brake operating mechanism including fluid pressure actuated means for applying the brakes of an automotive vehicle and automatic means for maintaining said brakes in proper adjustment.

It has frequently been proposed to apply brakes, and particularly those of automotive vehicles, by fluid pressure. In some systems a source of supply of higher than atmospheric pressure is provided for furnishing the brake applying force and in others a source of lower than atmospheric pressure is utilized. A common source of lower than atmospheric pressure is the reduced pressure created in the intake manifold of the internal combustion engine which drives the vehicle.

Our present invention is particularly designed to utilize this low pressure in the intake manifold of an engine. In previously proposed braking systems of this type, with which we are familiar, a single master cylinder and piston, together with a control valve for controlling the pressure applied to the piston, has been utilized and the piston has been connected through suitable linkage to operate the brakes on the wheels of the vehicle. In the present system it is proposed to provide individual pressure cylinders and pistons disposed at each wheel and forming an integral part of the brake mechanism proper. With this arrangement a single control valve may be located at any convenient point and the actuating pressure connected to the individual cylinders at the vehicle wheels by suitable fluid pressure conducting conduits.

Although our system is adapted for use either with a higher than atmospheric or lower than atmospheric pressure we prefer to utilize the low pressure created in the intake manifold of internal combustion engines, as this forms a convenient and satisfactory source of brake applying power.

Among the objects of our invention are: the provision of a simple braking system for automotive vehicles in which the usual more or less complicated brake applying linkage is done away with; the provision of a fluid pressure actuated brake operating means which is adapted to be disposed within the brake drum and secured to the backing plate or apron; the provision of a brake operating mechanism in which automatic means are provided for adjusting the brake shoes to compensate for wear of the braking surfaces thereof; the provision of a simple and compact brake applying unit which is particularly adapted for economical construction and minimum upkeep cost and in which the necessity for manual adjustment of the brakes is eliminated.

The above and other objects of our invention will appear from the following description of one embodiment thereof, reference being had to the accompanying drawing, in which:

Figure 1 is a side elevation of a brake unit equipped with our actuating and adjusting apparatus and showing the brake shoes in released position.

Figure 2 is a fragmentary cross section taken on line 2—2 of Figure 1.

Figure 3 is a diagrammatic plan view of an automobile equipped with our improved brake system.

The brake drum 1 may be of any suitable type and is preferably attached to the vehicle wheel (not shown) in the customary manner. The backing plate or apron 2 is secured to the vehicle axle (also not shown) and is provided with a recessed portion 3 in which the brake operating cylinder 4 is mounted. This cylinder 4 is provided with a flange portion 5 which seats upon the outer wall of the recess 3 and may be secured thereto by screws or rivets as indicated at 6.

In the type of brake illustrated, two shoes 7 and 8 are provided. These are supported at their upper ends by the anchor pins 9 and 10, respectively, which are secured to and extend out from the backing plate 2. The inwardly extending webs 11 and 12 of the shoes 7 and 8 are slotted at 13 and 14 to accommodate the anchor pins 9 and 10 to permit the proper adjustment and braking action to take place regardless of whether the vehicle is moving forward or backward. If the brake is applied when the drum is rotating in the direction of the arrow, the pin 9 will engage the end of slot 13 and anchor the shoes. Rotation of the drum in the opposite direction will cause the pin 10 to serve as the anchor. It will be understood that other anchor pin arrangements may be utilized if desired. To normally maintain the brake shoes in released position, springs 15 and 16 are secured at their outer ends to the flanges 11 and 12 and have their inner ends hooked through suitable apertures 17 and 18 in the backing plate 2. Springs 15' and 16' may also be provided to hold the upper ends of the shoes clear of the drum when the brakes are released. The stop pins 19 and 20 limit the movement of the lower ends of the shoes 7 and 8 in releasing direction. It will be understood that the springs 15 and 16 always exert a force tending to hold the flanges 11 and 12 of the shoes 7 and 8 against the pins 19 and 20 and thus to hold the braking faces of the shoes 7 and 8 out of contact with the brake drum 1.

Our improved brake operating mechanism will now be described.

The bottom ends of the brake shoes 7 and 8 are provided with transversely extending webs 21 and 22 against which bear the rollers 23 and 24. These rollers are rotatably mounted at the lower ends of the brake operating levers 25 and 26 which levers are pivotally secured together by means of a floating pivot pin 27. As is best seen in Figure 2 the upper ends of the levers 25 and 26 are offset as at 28 and are pivotally secured to the connecting links 29 and 30 which in turn are pivotally attached to the piston rods 31 and 32.

These piston rods 31 and 32 extend through and have a bearing in suitable apertures in the end caps 33 and 34 of the cylinder 4. Pistons 35 and 36 are adapted to move toward and away from each other within the cylinder 4 and are secured to the inner ends of the piston rods 31 and 32 respectively. The actuating fluid pressure supply source (such as the intake manifold of the vehicle engine) is connected to the cylinder 4 through the passage 37 which is formed in the nipple member 38. The outer end of the nipple 38 extends through the outer wall of the recessed portion 3 of the back plate 2 and a flexible hose 39, or other suitable fluid pressure conducting conduit, extends to the source of actuating fluid pressure, it being understood that a suitable control valve may be interposed in this conduit at any convenient point between the cylinder 4 and the pressure supply source.

A brake shoe adjusting screw 40, having oppositely threaded ends, extends across between the upper ends of the brake shoes 7 and 8. The oppositely threaded ends of the member 40 engage in correspondingly threaded portions of the flanges 11 and 12 of the brake shoes and a worm gear 41 is keyed or otherwise fixed to the central portion of the threaded adjusting member 40. By turning the worm gear 41 and the adjusting member 40 in the proper direction the upper ends of the shoes 7 and 8 may be spread apart. It is desirable to effect this spreading action of the brake shoes when the braking surfaces thereof have become worn to such an extent that the braking action is impaired. In order to accomplish this we have provided an extremely simple and effective automatic adjusting mechanism which will now be described.

A supporting pin 42 is mounted on the backing plate 2 and extends inwardly toward the brake drum. The inner end of this pin 42 is formed to provide a pivot for the lower end of the lever 43 and a stop bracket 44 is secured to the pin 42 and is adapted to engage the lever 43 to prevent movement of this lever further to the left (Figure 1) than is desired. A compression spring 45 is disposed between the lever 43 and a supporting bracket 46 which is secured to the end 33 of the cylinder 4. This spring 45 tends to maintain the lever 43 against the stop 44. At the upper end of the lever 43 is mounted a bar 47. This bar 47 is rotatably supported on a pin 48 and a flat spring 49, which is secured at its lower end to the lever 43 by a screw 50 exerts a force tending to move the arm or bar 47 upwardly so that its inner end is held in engagement with the toothed ratchet wheel 51. It will be noted that the inner end of arm 47 is formed in the shape of a hook which is adapted to engage the ratchet teeth of the wheel 51 and rotate said wheel when moved to the left (Figure 1) but not to rotate said wheel when moved to the right.

As is clearly seen in Figure 2 the ratchet wheel 51 is secured to the outer end of a shaft 52 which is rotatably mounted in a bearing formed in the upwardly extending lug portion 53 of the cylinder 4. The shaft 52 is also supported by and has a bearing in the bracket 54 and is prevented from endwise movement thereby. A worm 55 is mounted on the shaft 52 and engages the worm wheel 41. In order to prevent rotation of the worm 55, and consequently of the worm wheel 41 and adjusting screw member 40, in the wrong direction, that is, in a direction tending to draw the upper ends of the shoes 7 and 8 together, a pawl 56 is provided and is preferably supported on a suitable lug 57 formed on the cylinder 4.

From the above description it will be seen that, when the lever 43 is moved to the right (Figure 1) a distance great enough to cause the hooked end of the bar 47 to engage the next tooth on the ratchet wheel 51, and is then released, the spring 45 will cause the lever 43 to be returned to its original position against the stop 44. This movement will turn the ratchet wheel 51 a relatively small amount and will cause a corresponding movement of the worm 55, worm wheel 41 and adjusting screw 40. The oppositely threaded ends of the adjusting screw 40 are so cut that this movement will cause the upper ends of the shoes 7 and 8 to be spread apart a certain predetermined and relatively small distance to compensate for wear of the braking surfaces.

In order to actuate the lever 43 to cause the above described adjusting action to take place an arm 58 is secured to the link 29 and extends in a direction away from the backing plate 2 sufficiently so that it may engage the lever 43.

The action of our improved braking mechanism is as follows:

As shown in Figure 1 the parts are in the positions they assume when the brake is completely released. When it is desired to apply the brake the operator moves the control valve mechanism so that a certain degree of vacuum is applied to the interior of the cylinder, between the pistons 35 and 36, through the conduit 39 and the port 37. As the opposite sides of the pistons 35 and 36 are exposed to atmospheric pressure through apertures 59 in the end caps of the cylinder 2, the pistons 35 and 36 will be moved toward each other. This movement will cause the upper ends of the levers 25 and 26 to also be moved toward each other and the lower ends thereof, together with the rollers 23 and 24, to be moved apart. As the rollers 23 and 24 engage the transverse webs 21 and 22 of the brake shoes, this spreading movement of the lower ends of the levers 25 and 26 will cause the lower ends of the brake shoes to be moved apart and the surfaces of the shoes to be moved into braking engagement with the inner surface of the drum. It will be understood, of course, that the braking force applied will depend upon the pressure differential between the inner and outer sides of the pistons 35 and 36. By providing the levers 25 and 26 with relatively long upper ends and relatively short lower ends, these ends being defined in relation to the position of the floating pivot 27, a very considerable mechanical advantage is obtained and thus a much smaller cylinder may be used with any given available operating pressure. It will be understood, of course, that the operating cylinder and the levers 25 and 26 together with the location of the pivot pin 27 will be so proportioned that the desired braking force may be readily secured. By providing the links 29 and 30 between the upper ends of the levers 25 and 26 and the piston rods 31 and 32 the pistons and operating levers are positively connected and also the arcuate movement of the upper ends of the operating levers 25 and 26 is permitted.

When the brake lining 60, which is preferably secured to the outer faces of the shoes 7 and 8, is first installed it is of maximum thickness. Under these conditions the maximum movement of the upper end of the lever 25 will not cause the arm 58 to move the lever 43 and the bar 47 to the right sufficiently to engage the next tooth on the ratchet wheel 51. However, it will be seen that if the brake lining 60 has become worn a full application of the brakes will cause the pistons 35 and 36 to be moved closer together than they do when the lining is of maximum thickness and eventually a point will be reached where the piston 35 will move sufficiently to the right to cause the arm 58 to move the lever 43 and the bar 47 sufficiently to the right so that the hooked end of the bar 47 will engage the next tooth of the ratchet wheel 51. When this occurs, and the brakes are released by shutting off the actuating pressure, the spring 45 will cause the lever 43 and the bar 47 to be moved to the left until the lever 43 strikes the stop 44. During this movement the ratchet wheel 51 will be rotated a circumferential distance equal substantially to the length of one tooth and this rotation will effect a spreading of the upper ends of the brake shoes 7 and 8, as has been previously described. After this has occurred a full application of the brakes will not cause the bar 47 to engage the next tooth on the ratchet wheel 51 until the braking surfaces have again become worn a certain amount. Thus, with our improved automatic adjusting mechanism the brakes will be taken up whenever the braking surfaces have worn sufficiently to permit the bar 47 to engage the next tooth of the ratchet wheel 51 and the brakes will always be maintained in proper operating condition. The pawl member 56 prevents rotation of the ratchet wheel 51 in the wrong direction; also the worm 55 and worm wheel 51 are preferably made of the irreversible type so that there will be no tendency for the adjusting mechanism to be moved by vibration and road shocks.

In Figure 3 we have diagrammatically illustrated, in plan view, the chassis of an automotive vehicle equipped with our improved braking system. The braking units indicated at 63 are preferably of the type illustrated in Figs. 1 and 2. From each of these brake units 63 fluid pressure conducting conduits 64, 65, 66 and 67 extend to the control valve 68. The intake manifold 69 of the vehicle engine 70 is connected to the valve 68 by a conduit 71 and a brake controlling pedal 72 is adapted to operate the valve 68 and control the application of the vehicle brakes. It will be seen that with this arrangement the control valve 68 may be located at any convenient point on the vehicle, and, as the only connections between the control valve and the brake units at the wheels are the conduits 64, 65, 66 and 67, the usual complicated and expensive brake operating linkage is eliminated.

Although we have described the illustrated embodiment of our invention in considerable detail, it will be understood by those skilled in the art that modifications and variations may be made from the specific form herein shown and described without departing from the spirit of our invention. We do not, therefore, wish to be limited to the specific details shown in the attached drawing and described in the specification, but claim as our invention all embodiments thereof coming within the scope of the appended claims.

We claim:

In combination in brake mechanism of the type described, a brake drum, a backing plate, anchor pins secured to said backing plate and extending outwardly therefrom, brake shoes having inwardly extending web portions, said web portions being slotted to engage said anchor pins whereby movement of said shoes relative to said pins will be restricted, a fluid pressure cylinder secured to said backing plate, a pair of pistons in said cylinder, piston rods secured to said pistons and extending out of the opposite ends of said cylinder, a pair of brake shoe operating levers pivoted together at a point intermediate their ends by a floating pivot pin, one pair of ends of said levers being adapted to engage adjacent ends of said brake shoes, and links connecting the other pair of ends of said levers to the outer ends of said piston rods whereby movement of said pistons in said cylinder may be transmitted to said brake shoes and cause braking engagement of said shoes and drum and whereby said pair of levers and said floating pivot pin may move relative to the backing plate.

FREDERICK G. FOLBERTH.
WILLIAM M. FOLBERTH.